Jan. 12, 1926.

G. CONSTANTINESCO

POWER TRANSMISSION

Filed July 25, 1923    6 Sheets-Sheet 1

1,569,719

INVENTOR
G. Constantinesco
by J. M. Lewis
Atty

Jan. 12, 1926.
G. CONSTANTINESCO
POWER TRANSMISSION
1,569,719
Filed July 25, 1923     6 Sheets-Sheet 2
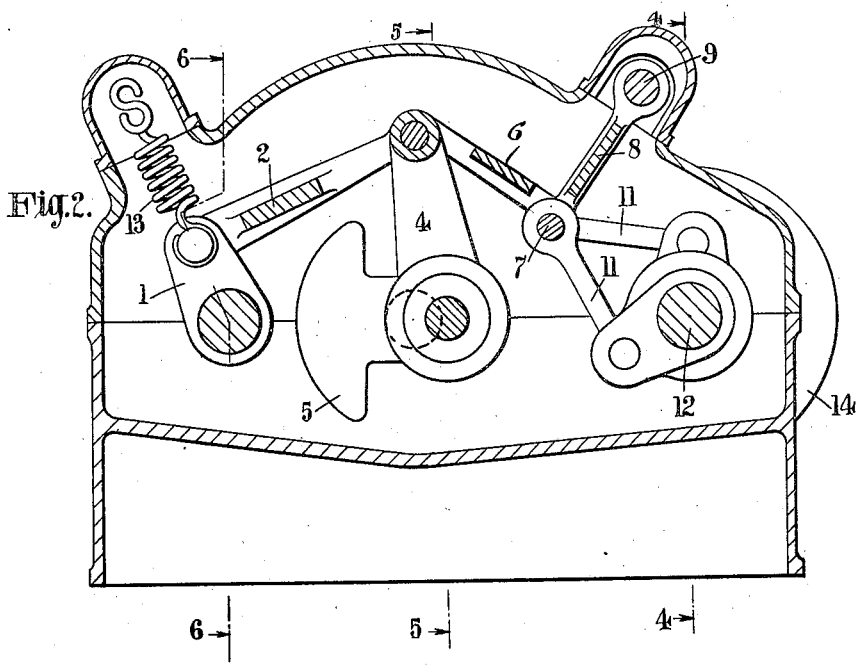
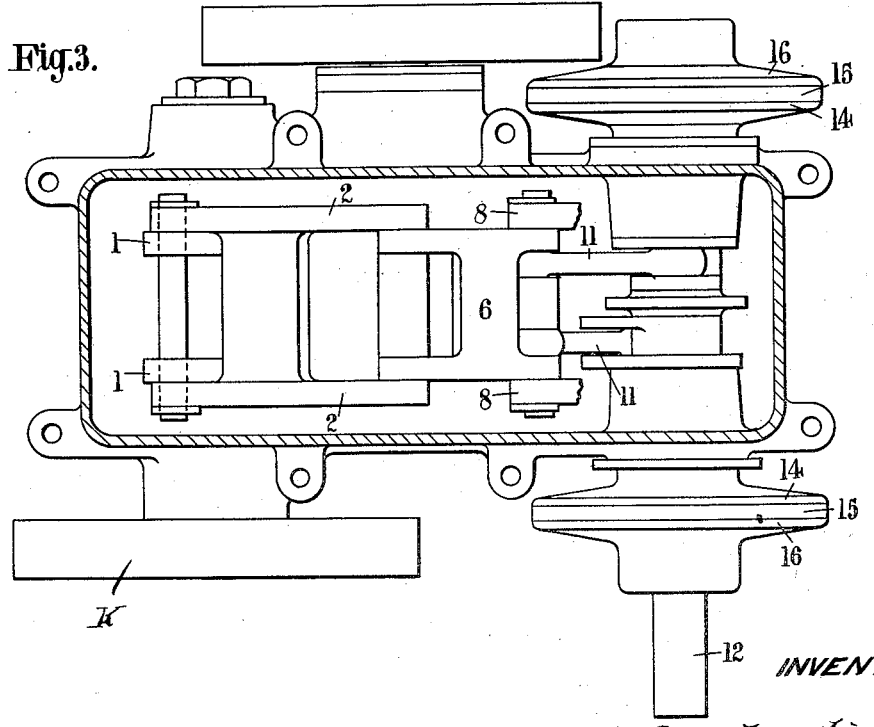
INVENTOR
G. Constantinesco Jan. 12, 1926.

G. CONSTANTINESCO

POWER TRANSMISSION

Filed July 25, 1923

INVENTOR
G. Constantinesco
By
Atty

Jan. 12, 1926.

G. CONSTANTINESCO

POWER TRANSMISSION

Filed July 25, 1923  6 Sheets-Sheet 4

1,569,719

INVENTOR

G. Constantinesco

Atty

Jan. 12, 1926.

G. CONSTANTINESCO

POWER TRANSMISSION

Filed July 25, 1923        6 Sheets-Sheet 5

1,569,719

INVENTOR
G. Constantinesco

Atty

Jan. 12, 1926.

G. CONSTANTINESCO

POWER TRANSMISSION

Filed July 25, 1923      6 Sheets-Sheet 6

INVENTOR
G. Constantinesco

Atty.

Patented Jan. 12, 1926.

1,569,719

UNITED STATES PATENT OFFICE.

GEORGE CONSTANTINESCO, OF WEYBRIDGE, ENGLAND.

POWER TRANSMISSION.

Application filed July 25, 1923. Serial No. 653,772.

*To all whom it may concern:*

Be it known that I, GEORGE CONSTANTINESCO, a subject of the King of Great Britain and Ireland, residing at "Carmen Sylva," Beechwood Avenue, Oatlands Park, Weybridge in the county of Surrey, England, have invented certain new and useful Improvements in Power Transmission, of which the following is a specification.

The present invention relates to the transmission of power from prime movers to shafts which are to be rotated against variable resisting torque.

In my British patent specification No. 185,022 I have described a method and apparatus by which variable torque and speed can be obtained from a single alternating or sinusoidal motion by splitting such motion in two alternating or sinusoidal motions of the same frequency, one of these being caused to oscillate a mass about a mean position, while the other is caused to oscillate a pair of unidirectional driving devices, moving in opposite phase but driving a shaft in one direction.

In apparatus described in the said specification a floating lever is employed connected at one point to the prime mover and at another point carrying or connected to an effective mass while one or two other points are connected to a pair of unidirectional devices moving in opposite phase and giving motion in one direction to the driven shaft.

The object of the present invention is to provide a modified method and apparatus for transmitting power from a prime mover to a shaft which has to be rotated against a variable resistance giving a similar result to that given by the method and apparatus described in my said specification.

The invention consists in a method of splitting alternating motion into two components by means of three links meeting at a common point, the free extremities of such links being subjected respectively one to a driving force or forces, the second to the reactance of a mass, and the third to the resistance to be overcome.

The invention further consists in a modified method and apparatus for the purpose specified in which the alternating motion derived from the prime mover is transmitted by a link to an oscillating pivot which is connected to a second link to a lever swinging above a fixed point and carrying a mass, and by a third link to a point on a stabilizing link swinging about a fixed point, this stabilizing link being connected to a pair of unidirectional driving devices moving in opposite phase and driving a shaft in one direction.

I have found that in such systems in which more than one degree of freedom is allowed so that the actual motion and torque which takes place depends on the element of time owing to the relative variation of speed of the driving shaft and of the driven shaft, certain geometrical relations between the various pivots and links are necessary to produce the required result.

The apparatus constructed according to such systems may be regarded as comprising a common pivot, namely, the oscillating pivot at which three links meet. One of these links is connected to the driving crank, the second to a lever carrying a mass or flywheel capable of oscillating about a mean position, and a third to a pivot capable of swinging about a fixed point and driving a rotor through a pair of unidirectional driving devices which operate alternately.

If the angles between the three links meeting at the common point are A, B and C; and X, Y and Z are the displacements of the links moving towards the common point substantially in the direction of their lengths so that the angles, A, B and C are substantially constant; the link whose displacement is X being opposite the angle A, Y opposite B, and Z opposite C respectively, the necessary condition between the displacement X, Y, Z for the proper operation of the apparatus is that a linear equation shall exist between these movements. On the other hand it can be shown that the following relation always exists between these variables:—

$$X \sin A + Y \sin B + Z \sin C = 0.$$

It follows that it is sufficient that the angles A, B, C should be chosen so that their sines are constant and shall not vary with variation of X, Y and Z. In order that the apparatus may work in practice however, it is sufficient that the sines of the angles A, B and C shall be approximately constant.

In order to obtain a system capable of automatically transforming or splitting the rotary movement of the driving shaft between the inertia device and the driven shaft between wide limits of variation of torque to be overcome at the driven shaft, it is sufficient to provide a combination of three links or constant length meeting at a common point which is not restrained in the plane of the links, the other ends of the links being arranged to oscillate respectively an inertia device, a pair of unidirectional driving devices working in opposite phase and driving a crank, the arrangement being such that the sines of the angle between the links remain approximately constant.

The arrangement is suitable for use in connection with prime movers working either at constant torque or at constant speed or developing constant energy.

If $A=B=C$, that is if the links are inclined at 120 degrees to each other, or if continuations of the links are inclined to each other at this angle, the relation reduces to $$X+Y+Z=O.$$

The present invention further consists in apparatus for transmitting power from a driving shaft to a shaft which has to be rotated against a variable resisting torque including various arrangements of links fulfilling approximately the essential geometrical condition as defined above.

The invention also consists in a unidirectional driving device comprising a stabilizing link pivoted at a fixed point and having at its free end a pivot oscillated about a mean position and connected to a ratchet device alternately engaging and disengaging a rotor mounted on a fixed axis, the various pivots being so disposed that the ratchet devices moves at double the frequency of the driving oscillation.

The invention also consists in a method and apparatus for transmitting power from a prime mover to a shaft which has to be rotated against a variable resistance so arranged that the alternating motion derived from the prime mover is transmitted by a link to an oscillating pivot which is connected by a second link to a member swinging about a fixed point and carrying a mass and by a third link to a point on a stabilizing link swinging about a fixed point at double frequency, this stabilizing link being connected to a unidirectional driving device, driving a shaft in one direction.

The invention further consists in subjecting the jamming member of the ratchet to an external force, for example by means of a spring attached to a fixed point so that the spring exerts an external and independent force on the jamming members and through it a torque on the rotor and thus operates to give to the system a definite mean position when there is no resisting torque on the rotor.

The invention also consists in providing a reversing ratchet device operated as desired in either direction of rotation, the jamming member of the ratchet being connected by springs to a reversing lever arranged so that the force applied to the jamming member can be reversed according to the direction of rotation desired, the fixed pivots of the two stabilizing links which carry the driving pivot being arranged as half bearings so that motion in one direction of the fixed pivots is restrained for one direction of rotation of the driven member and motion in the opposite direction of the fixed pivots is restrained for rotation in the opposite direction of the driven member. By such arrangement for either direction of rotation of the rotor, each stabilizing link is only subjected to tension.

The invention further consists in apparatus of the type specified arranged so that the moving parts are balanced.

The invention further consists in apparatus of the type specified in which provision is made for reversing the direction of motion of the driven shaft.

The invention also consists in a symmetrical double arrangement in which reversing is provided for and in which further a mean position is automatically maintained for either direction of rotation of the driven member.

The invention also consists in the improved method and means for transmitting motion from a driving shaft to a shaft to be rotated against a variable resisting torque hereinafter described.

Referring to the accompanying diagrammatic drawings:—

Figure 2 is a side elevation partly in section of one modification;

Figure 3 is a sectional plan of the same;

Figure 4 is a section on the line 4—4, Figure 2, while

Figure 8 is a section on the line 2—2, Figure 7, while

Figure 1:
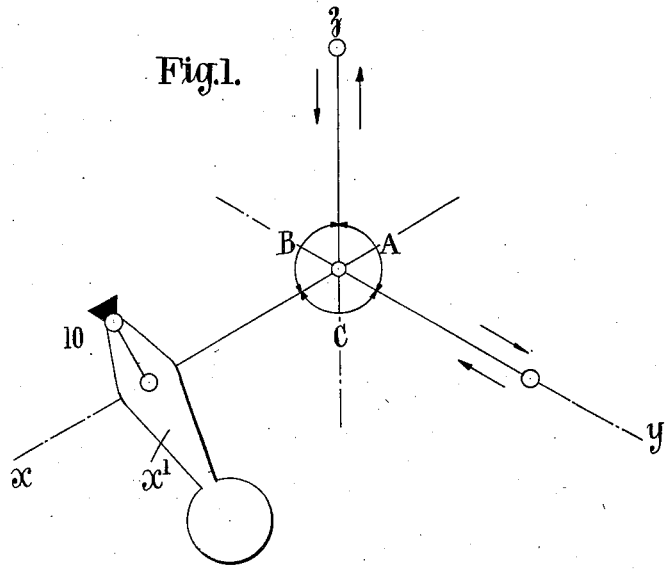
Figure 1 is a diagram illustrating the invention.
Figure 6:
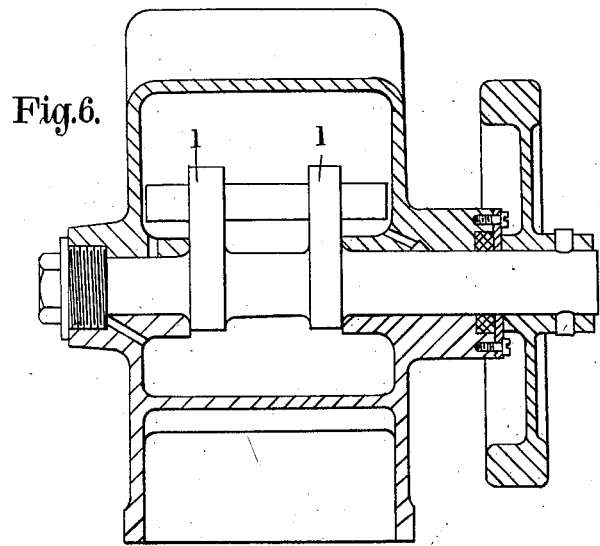
Figure 6 is a section on the line 6—6, Figure 2.
Figure 4:
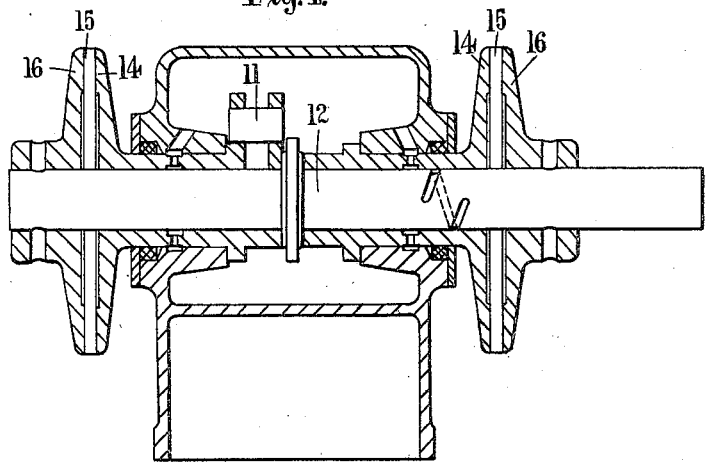
Figure 5:
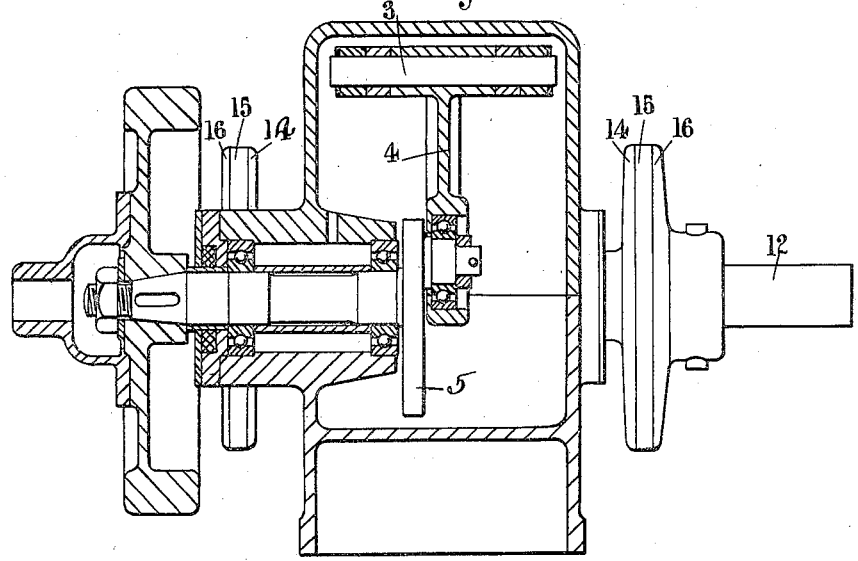
Figure 5 is a section on the line 5—5, Figure 2.

In the diagram, Figure 1, three links $x, y, z$ inclined substantially at an angle to each other of 120 degrees are connected to a common pivot. The angle between the links are represented by A, B, C, and the displacement in the line of the link by X, Y, Z. The force to be transmitted is applied through the link $z$. The link $x$ is connected to an arm $x'$ pivoted at a fixed point 10 and carrying at one end a mass and the link $y$ is connected to the working device, for example, a pump or compressor. By this means the motion of the driving link $z$ is split between an oscillating mass and the working member connected to the link $y$.

In the modification of the invention shown in Figures 2 to 6, the driving crank is connected by a link 4 to the common pivot 3 which is connected by a second link 2 to an oscillating flywheel $k$ and by a third link 6 to a pivot 7 restrained by an arm 8 pivoted at a fixed point 9 and connected to a pair of unidirectional driving devices 11, 11 acting on the driven member 12. The fixed pivots of the oscillating crank 1 driving shaft and driven member may conveniently be placed in the same plane which may conveniently form the plane of division of the casing with consequent simplification of the arrangement of the bearings. The angle between the link 2 and the link 6 connected to the unidirectional driving devices is 120 degrees and the angles between the link 6 and the link 4 connected to the driving crank is 60 degrees, so that the line forming the continuation of the link 4 through the common point and the lines of the links 2 and 6 meet at the common point at an angle of 120 degrees, but any other suitable angles may be selected. 5 is a counterweight.

In order to provide for the stability of the system when running at no load, there may be provided stabilizing springs such as 13. If stabilizing tension rods are employed for both directions of rotation they should lie in a direction at right angles to the direction of oscillation of the pivot to which they are connected and half bearings may be employed restraining movement in one direction only and allowing freedom of movement in the opposite direction.

The unidirectional driving devices employed in the apparatus illustrated comprise discs 14 which are oscillated by the unidirectional driving devices and caused when moving in one direction to press hard against rubber pads 15 whose other faces are in contact with flanges 16 keyed to the rotor shaft. Similar flanges and pads are provided at the two ends of the shaft and it will be seen that the rubber is situated outside the casing so that oil will not come in contact with it. Such arrangement are fully described in my British patent specification No. 205,293 (or Serial No. 653,774, filed 25th of July, 1923.)

Figure 7:
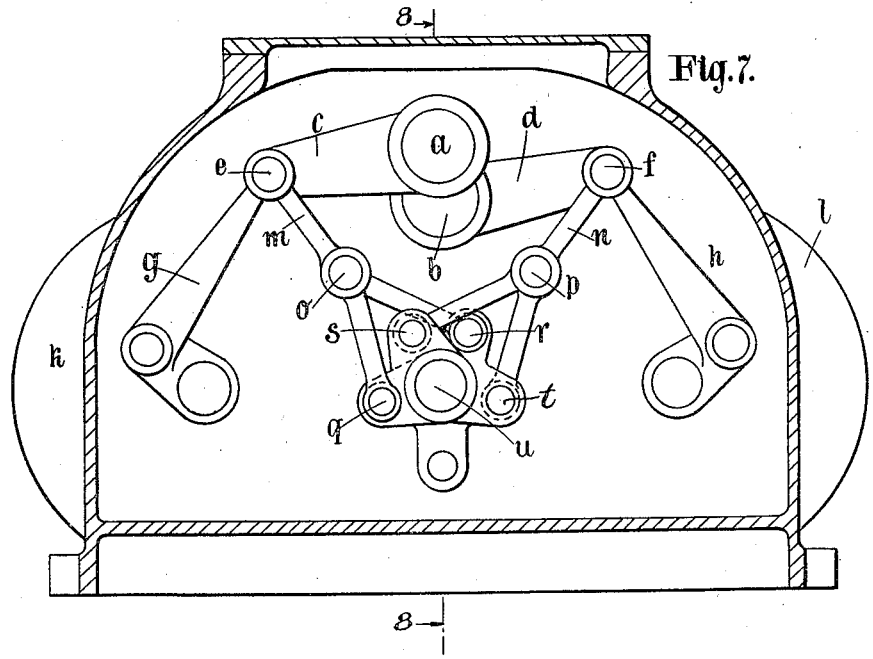
Figure 7 is a side elevation of another form of the apparatus.
Figure 8:
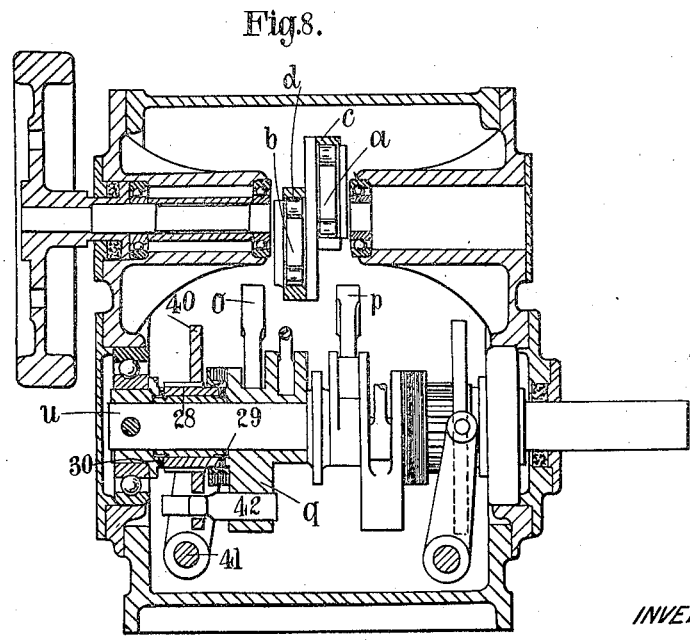
Figure 9:
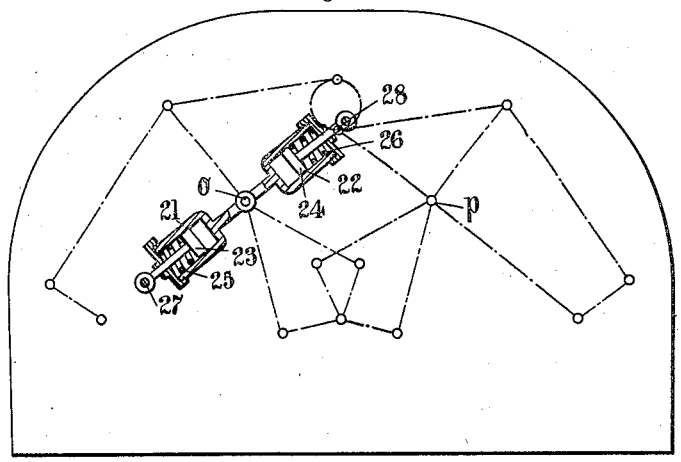
Figure 9 is a diagram showing the mechanism adopted for maintaining the parts in a mean position.

In carrying the invention into effect according to the example illustrated in Figures 7, 8 and 9, the two driving eccentrics $a$ $b$ are connected by links $c$ $d$ to common points $e$ $f$. The common points $e$ $f$ are connected by second links $g$ $h$ to oscillating flywheels $k$ $l$ and by third links $n$ $m$ to pivots $o$ $p$ restrained by cylinders 21, 22, see Figure 9, in which work pistons 23, 24, restrained by springs 25, 26, the piston rods being pivoted to fixed points 27 and 28. The pivots $o$ $p$ are also each connected to a pair of unidirectional driving devices $q$ $r$ and $s$ $t$ acting on the same driven member $u$ in a similar manner to that described in my British patent specification No. 185,022. The fixed pivots of the oscillating flywheels and of the driven member may conveniently be placed in a single plane as illustrated, or the arrangement illustrated may be inverted in which case lubrication can be readily effected by splash from the driving eccentrics which may be immersed in oil.

Considering one side only of the apparatus, the mean angle between the driving link $c$ and the link connecting the common point $e$ to the oscillating flywheel is 120 degrees and the mean angle between the link $c$ and the link $m$ connected to the unidirectional driving devices is 60 degrees so that the link $c$, link $g$ and the continuation of the link $m$ are inclined at 120 degrees. For a comparatively short throw of the driving eccentric and a small oscillation of the flywheel $k$, these angles will not vary greatly during the rotation.

It will be seen that according to this example of the invention, the driving shaft is mounted immediately above the driven shaft, while the oscillating flywheels are symmetrically arranged on each side of the vertical plane through the two shafts.

The reversing mechanism and the ratchet devices are shown in Figure 8 and comprise a slider 28 having large teeth 29 on the side nearer the oscillating member and small teeth 30 on the side next to the rotating member. An additional inertia member 40 is provided sliding on keys on the slider and adapted to be moved laterally by a fork on the shaft 41 so that the motion of the slider relatively to the oscillator is prevented in one direction or the other by suitable projections and recesses on the pin 42 carried by the oscillating member *q*. A similar arrangement is provided on the other side of the apparatus. This form of ratchet device and reversing mechanism is similar to that described in my British patent specification No. 205,293. Any other form of reversing ratchet mechanism may be used.

The stability of the system is provided for by cylinders 21, 22 connected to the pivot *o* and co-operating with pistons 23, 24 acting against springs 25, 26, the piston rods being connected to fixed pivots 27, 28. By this arrangement the mean position of the apparatus is rendered stable.

Figure 10:
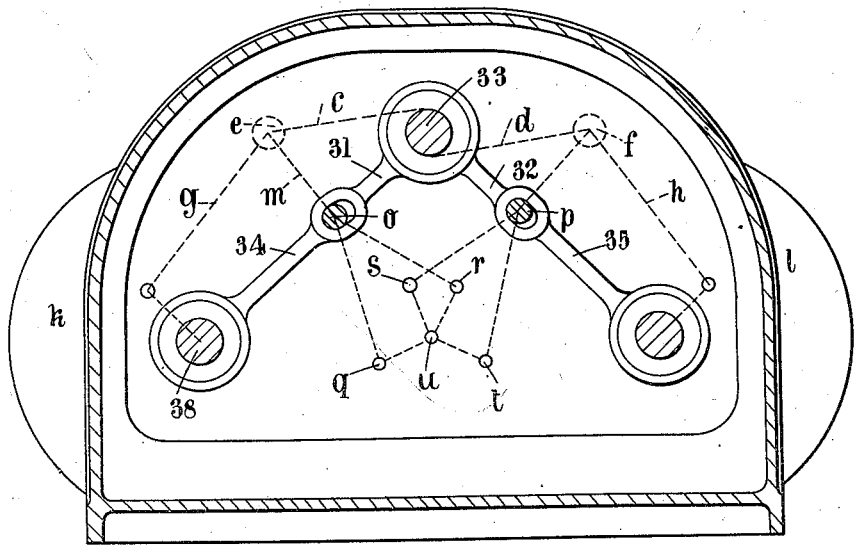
Figure 10 is a diagram showing a modified mechanism for maintaining the parts in a mean position.

Instead of spring pressed pistons, stabilizing tension rods 31, 34, 32, 35 may be provided as shown in Figure 10. In this figure, taking one side of the apparatus, the common pivot *o* is connected by links 31, 34 to the fixed pivot 33 and the fixed pivot 38 of the oscillating member *k*, the links being provided with slots allowing a slight movement in one direction and restraining it in the other direction. Similar links 32, 35 are provided on the other side of the apparatus. For motion in one direction the pivots *o p* will be in the position shown, while for motion in the opposite direction the pivot *o* will move upwards to the upper end of its slot and the pivot *p* downwards to the lower end of its slot. In this manner an arrangement is obtained which is self centering for either direction of rotation, while at the same time every part of the apparatus is satisfactorily balanced.

Figure 11:
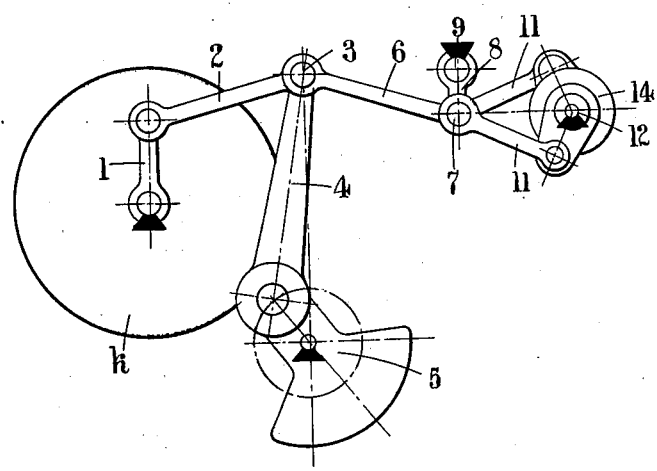
Figure 11 is a diagram showing a further modification of the invention in which impulses are obtained on the rotor at double the frequency of the driving link.

In the form of the invention shown in Figure 11 which shows a double frequency arrangement, the crank of the driving member 5 is connected by the link 4 with the common pivot 3 which is connected by a link 2 to the crank 1 on the inertia member *k*. The pivot 3 is also connected by a link 6 with the pivot 7 situated at the end of a stabilizing link 8 moving about a fixed pivot 9. The pivot 7 is connected to a pair of ratchet devices acting on the rotor 14 by the connecting rods 11.

In this form of the invention the centres of the various pivots are such that the pivot 7 oscillates about the fixed point 9 with double the frequency of oscillations of the pivot 3.

Figure 12:
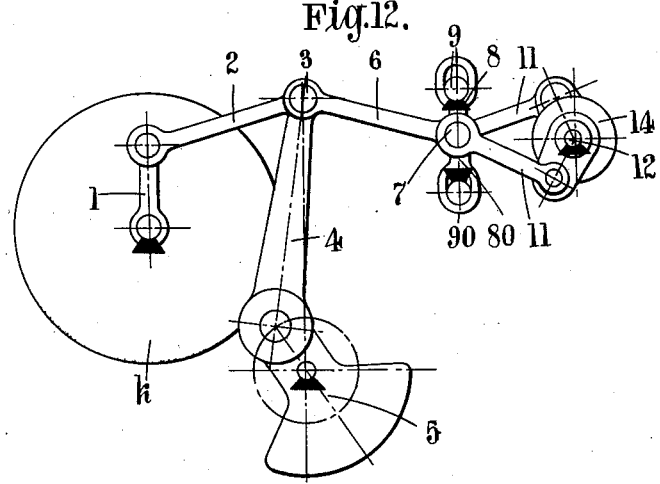
Figure 12 is a diagram showing a modified form in which two stabilizing links are provided to enable the rotor to be driven in either direction.

In the modified form shown in Figure 12, two stabilizing links 8, 80 are provided connected to the pivot 7 and arranged so that they come into operation alternately according to the direction of rotation of the rotor, two fixed pivots 9, 90 being provided so that for rotation in one direction, the stabilizing link 8 oscillates about the pivot 9, while for rotation in the opposite direction, the stabilizing link 80 oscillates the pivot 90.

With the arrangement shown in Figure 11 and 12 the system is stable provided there is a load on the rotor 14.

It will be seen that with transmission mechanism as above described none of the links are subjected to bending stress, the links being either in compression or in tension so that a lighter mechanism can be employed, the heavy bending stresses which occur in a mechanism in which a floating lever is employed being completely avoided.

I claim—

1. Apparatus for transmitting power from a driving shaft to a driven shaft which is to be rotated against a variable torque, comprising in combination a driving shaft, means for obtaining alternating motion from said shaft, three links meeting at a common point and serving to split such motion into two components of variable amplitude, means for transmitting said alternating motion to the extremity of one of such links, a connection from the second of said links to a lever swinging about a fixed point and carrying a mass, a driving pivot at the free end of the third of said links, stabilizing means connected to said pivot and unidirectional driving devices connected to said driving pivot moving in opposite phase and driving a shaft in one direction.

2. Apparatus for transmitting power from a driving shaft to a driven shaft which is to be rotated against a variable torque, comprising in combination a driving shaft, means for obtaining alternating motion from said shaft, three links meeting at a common point and serving to split such motion into two components of variable amplitude, means for communicating alternating motion to the end of one of such links, means by which the free end of the second link is subjected to the reaction of a mass, and means by which the free end of the third link is operatively connected with the driven shaft through unidirectionals which convert the oscillations into rotary motion.

3. Apparatus for transmitting power from a driving shaft to a driven shaft which is to be rotated against a variable torque, comprising in combination a driving shaft, means for obtaining alternating motion from said shaft, three links meeting at a common point and serving to split such motion into two components of variable amplitude, means for communicating alternating motion to the end of one of such links, means by which the free end of the second link is subjected to the reaction of a mass, stabilizing means connected to the third link at its free end and operative connection of this same end with unidirectional driving devices which impart double frequency impulses to the rotor.

4. Apparatus for transmitting power from a driving shaft to a driven shaft which is to be rotated against a variable torque, comprising in combination a driving shaft, means for obtaining alternating motion from said shaft, three links meeting at a common point and serving to split such motion into two components of variable amplitude, means for communicating alternating motion to the end of one of such links, means by which the free end of the second link is subjected to the reaction of a mass, a driving pivot at the free end of the third of said links, a stabilizing link swinging about a fixed point and connected to said pivot, and a pair of driving devices connected to said driving pivot moving in opposite phase and driving a rotor in one direction.

5. An automatic variable speed gear for transmitting power to driven shaft which has to be rotated against a variable resisting torque, comprising in combination a driving crank, a link operated by the said crank, a freely supported mass capable of oscillation, a pair of unidirectional driving devices adapted to drive a driven shaft alternately in the same direction, and means for splitting the motion of said driving crank between said oscillating mass and said unidirectional driving devices, said means comprising two links pivoted to a common pivot on the aforesaid link, one of them operatively connected with the oscillating mass and the other with the unidirectional driving devices, said three links being so disposed that the algebraic sum of the products of the displacement of each in its line of action by the sine of the angle between the other two shall be substantially equal to zero.

In testimony whereof I affix my signature.

GEORGE CONSTANTINESCO.